INVENTOR.
Baltzar Carl von Platen
BY
Attorney

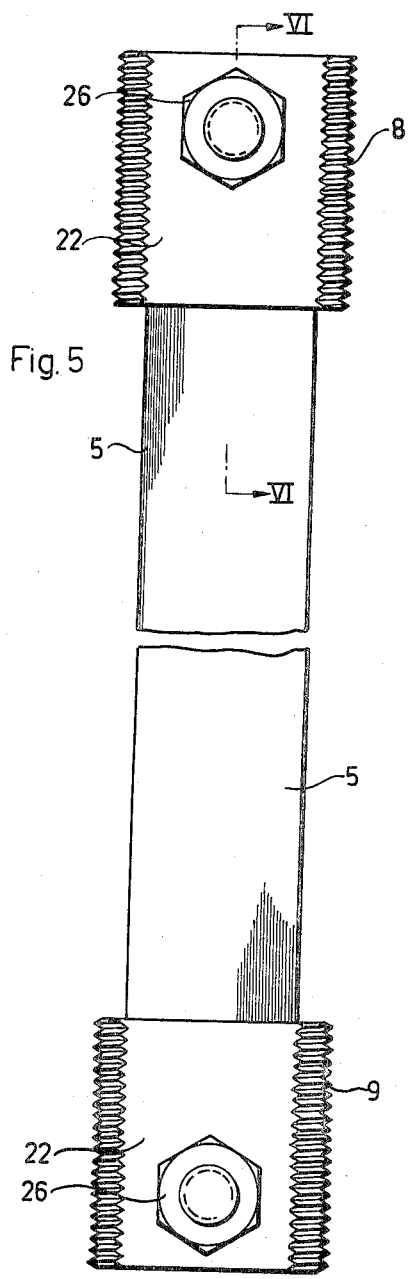
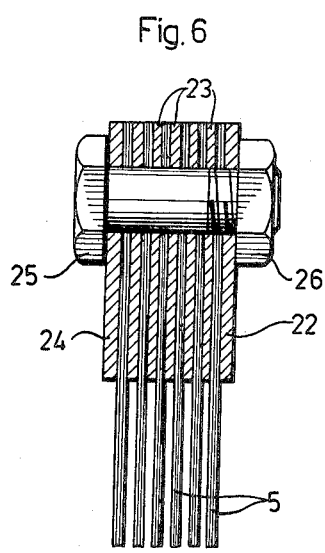
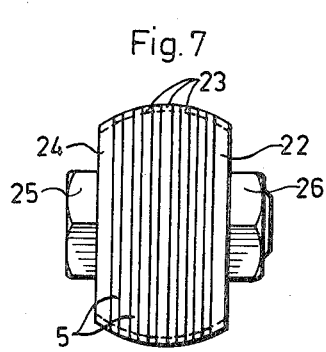

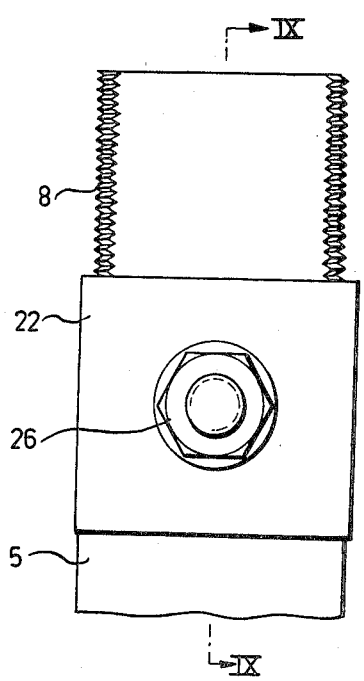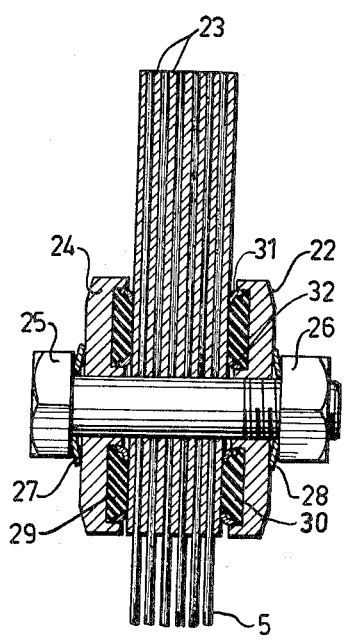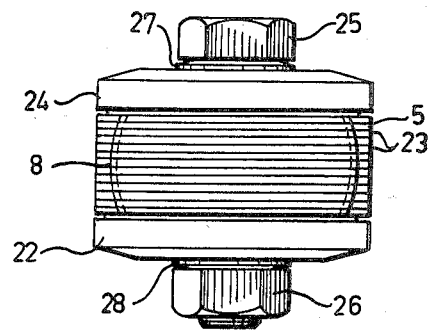

United States Patent Office 2,970,186
Patented Jan. 31, 1961

2,970,186

HIGH TENSION SUSPENSION ELECTRIC INSULATORS

Baltzar Carl von Platen, Gotgatan 16, Stockholm, Sweden

Filed Feb. 2, 1959, Ser. No. 790,706

5 Claims. (Cl. 174—179)

This invention relates to electric insulators and more particularly to high tension suspension insulators comprising a tubular vitreous body and metallic fixtures at opposite ends thereof.

The primary object of the invention is to provide a suspension insulator of improved insulating power.

A second object of the invention is to provide a suspension insulator the interior of which is effectively separated from the surrounding atmosphere so that neither moisture nor any other extraneous substances can reach it.

Another object of the invention is to provide a suspension insulator of improved mechanical strength.

A further object of the invention is to provide a suspension insulator comprising a member located in the space encompassed by the tubular vitreous body and capable of keeping said space separated from the external atmosphere and of substantially increasing the maximal mechanical load to which the insulator can be subjected.

A still further object of the invention is to provide a suspension insulator the tubular vitreous body of which is never subjected to mechanical tension stresses.

Generally, an insulator according to the invention comprises, within its tubular vitreous body, a member of high tensile strength and preferably formed by a large number of very thin vitreous wires which are connected to the metallic caps provided at each end of the insulator and tension biased to such an extent that the tubular body is held under compression between the metallic fixtures even at maximum values of the downward force caused by the electric cable that the insulator is carrying.

The above-mentioned as well as other objects of the invention and advantages thereof will appear from the following detailed description when read in conjunction with the accompanying drawing in which:

Fig. 5 is a view in elevation of a rod-shaped member forming part of an insulator according to another embodiment of the invention;

Fig. 6 is a fragmentary view in vertical section taken along the line VI—VI in Fig. 5;

Fig. 7 is a top view of the member shown in Fig. 5;

Fig. 8 is an elevational view of the upper portion of a member of the same general type as that shown in Figs. 5—7, but slightly modified;

Fig. 9 is a vertical sectional view taken along the line IX—IX in Fig. 8;

Fig. 10 is a top view of the member shown in Fig. 8.

Figure 1:
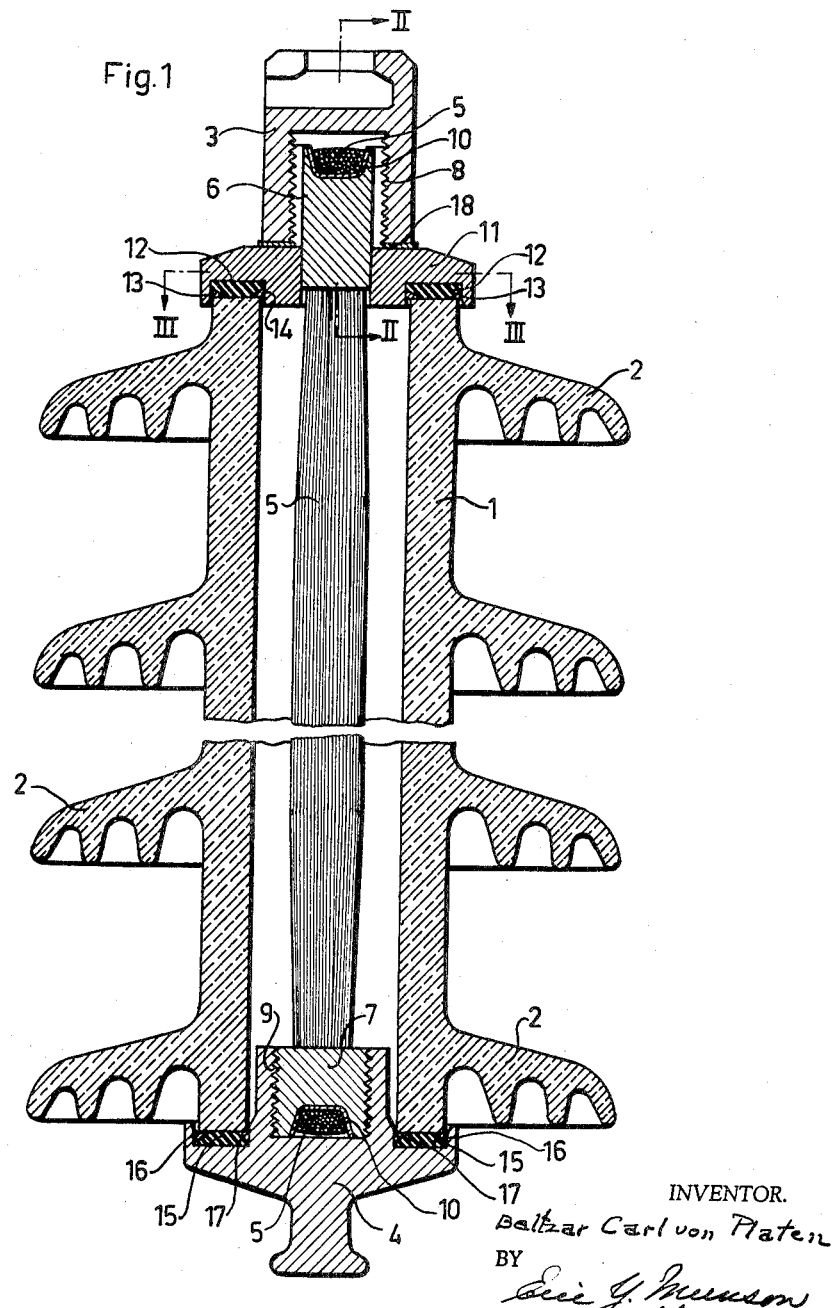
Fig. 1 is a view in sectional elevation of an insulator according to one embodiment of the invention.

The two principal advantages realized from an insulator constructed in accordance with this invention are that perfect sealing can be attained at the joints between the vitreous tubular insulator body and the fixtures, located at opposite ends thereof, and that said body cannot crack from mechanical tension stresses whereby the risk of the electrical line falling down is substantially entirely eliminated.

In suspension insulators of the kind hereinabove specified it is a matter of extreme importance that effective sealing is maintained between the tubular insulator body and its fixtures during all conditions of operation. If not, moisture or solid contaminations may reach the interior of the insulator thereby forming a leakage current path much shorter than the exterior one running across the annular flanges always provided on the outside of such insulators. The obvious result will be break-down between the metallic fixtures. In addition thereto, the space within such an insulator is often filled with a gas or a liquid of eminent dielectric properties, such as transformer oil. It is easily understood that such a construction increases the demands for perfect sealing as the escape of the filling medium must be effectively prevented. However, when tensional stresses appear in the tubular insulator body they are transmitted to the joints between said body and the metal fixtures. As these joints have hitherto always been of the cemented type they have been unable of resisting such stresses thus spoiling the sealing established at the manufacture of the insulator. According to a preferred embodiment of this invention, the cemented joints are replaced by packings of a resilient material, such as rubber, located between each annular end surface of the tubular insulator body and the adjacent metallic fixture. In accordance with another embodiment the surfaces of the insulator body and of the fixtures contacting each other are machined to accurate smoothness thus preserving the sealing. In either case the member disposed within the tubular body is tension biased to such an extent that said body and the sealings are under compression also at maximal mechanical load on the insulator from the suspended line.

The fact that the vitreous body is always under compression is of vital importance also on the ground that it is thereby protected from tension stresses which might spoil it. To achieve this it is when assembling the insulator, necessary to apply a very high corresponding bias force because the downward force exerted on the insulator by the suspended line also amounts to very high values. By way of example, if the expected loading force is about 25 tons, the compression bias in the insulator body in its unloaded condition may be 1–10 tons higher and preferably about 5 tons higher. Correspondingly, if the expected loading force is about 100 tons the bias in absence of load may be 105–110 tons.

Reference is now made to the drawings in which like or similar parts have throughout been given the same reference characters.

Figure 2:
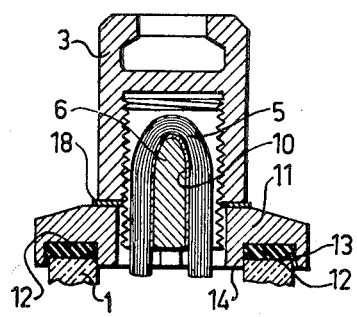
Fig. 2 is a fragmentary view in vertical section taken along the line II—II in Fig. 1.
Figure 3:
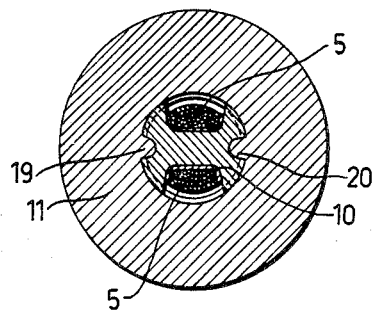
Fig. 3 is a horizontal sectional view taken along the line III—III in Fig. 1.

Turning first to Figs. 1–3, reference numeral 1 designates a non-metallic tubular body consisting of any suitable vitreous material and provided with external flanges 2. At the top and bottom of the insulator tube 1 there is a metallic cap or fixture, 3 and 4, respectively. Extending between caps 3 and 4 is a member 5 consisting of a large number of very thin vitreous wires disposed in parallel and in close contact with each other and suitably held together, at least at their ends, by some plastic binding agent. Their thickness may be about 10 μ and the vitreous material may be constituted by high quality glass. However, it falls within the scope of this invention to manufacture the member 5 from any material having sufficient strength properties. As appears most clearly from Fig. 2, the member 5 is shaped like a closed loop, or link, the ends of which rest against correspondingly curved contact surfaces on substantially cylindrical parts 6 and 7 having external threads 8 and 9, respectively, engaging corresponding internal threads on the caps 3 and 4. The contact surfaces between each of the parts 6 and 7, which suitably are forged and thus have a comparatively rough surface, is provided with a smooth steel lining 10 for the purpose of protecting the thin vitreous wires of the member 5. Disposed between the top cap 3 and the vitreous body 1 there is a sturdy washer 11, the bottom of which has an annular recess for a packing 12 of a resilient substance, e.g. rubber, resting against the tube 1. In order to prevent the high pressure exerted on the packing by the bias in member 5 from pressing the packing material out at the sides thereof metal rings 13 and 14 are arranged there. Correspondingly, between the bottom fixture 4 and the tubular body 1 there is a packing 15 with metal rings 16 and 17. Reference numeral 18 designates a sealing ring preferably made of a soft metal such as copper and interposed between parts 3 and 11, the latter of which also has two axial ribs 19 and 20 located in diametrically opposed relationship and engaging corresponding grooves in part 6.

The assembling of an insulator according to Figs. 1–3 will now be described. First, parts 6 and 7 are placed at the respective ends of the loop-shaped member 5 whereupon the other details forming part of the bottom insulator fixture, i.e., 4, 15, 16, 17, are joined to part 7 by screwing the latter onto the threads 9 of cap 4. Thereafter, washer 11 and its associated parts 12, 13 and 14 are placed at the opposite end of the insulator tube 1 whereupon part 6, against the contact surface of which member 5 is resting, is introduced through the central opening of washer 11. The packing ring 18 is placed on top of washer 11 whereafter fixture 3 is screwed on to the threads 8 of part 6. During that step, washer 11 is prevented from rotating and due to the engagement between the ribs 19, 20 and their grooves part 6 and member 5 are likewise prevented from rotating. The rotational movement is interrupted when the bottom surface of cap 3 slightly engages the top surface of ring 18. To the caps 3 and 4 are then applied an outward force elastically stretching the loop-shaped member 5 to a predetermined value. With this force still applied and kept substantially constant cap 3 is screwed inwardly until it again touches ring 18 whereupon said force is removed. Due to the elastic elongation of member 5 this will now hold the fixtures firmly pressed against the ends of the insulator body with a force corresponding to the primary outward force just mentioned. This means that a perfect sealing is attained at the packing rings 12, 15 and that the insulator body becomes subjected to a compression bias. In accordance with the principles underlying this invention that bias shall be of such a magnitude that even when the load carried by the insulator is at maximum packings 12 and 15 shall still be pressed against the insulator tube 1 with a force of sufficient value to guarantee perfect sealing. A further advantage resides therein that the insulator body will never be subjected to tensional stresses which might develop its cracking. When the invention is carried out practically the magnitude of the bias is determined with regard to the dimensions of the insulator body and to the expected maximum load. As has already been mentioned, the bias should preferably be so selected that it still amounts to at least 1 ton also at maximum suspension load.

Figure 4:
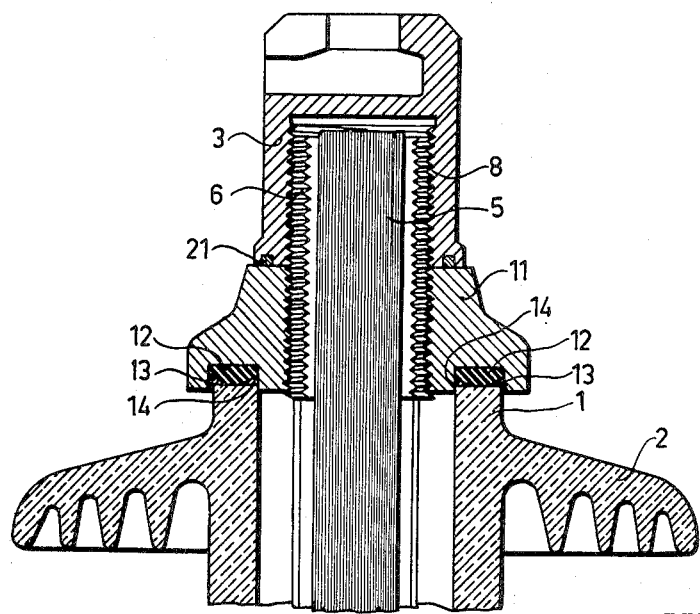
Fig. 4 is a fragmentary view in vertical elevation showing a modified arrangement of the metallic fixtures at the end of the insulator.

The insulator illustrated in Fig. 4 differs from the one just described in that washer 11 is essentially thicker and also has internal threads engaging the threads of part 6. The assembling of an insulator according to Fig. 4 is terminated by screwing the washer 11 and the cap 3 on to part 6 whereafter a tensional force is applied between caps 3 and 4 as hereinabove described. While that force still is present, washer 11 is screwed down to contact with the insulator body whereupon the force is removed. Finally, cap 3 is screwed down to engagement with washer 11, sealing between them being attained by means of a sealing ring 21. It appears that the threads of the cap 3 are not subjected to bias after the assembling operation has been completed.

In the embodiment of the invention illustrated in Figs. 5–7 the bias member 5 is constituted by a rod instead of a loop, or link. The rod is likewise formed by a large number of very thin glass wires which at their ends are divided into a number of bundles. The wires in each bundle are cemented by means of some suitable binding agent which preferably also is of the plastic type. The bundles are inserted between a number of plates 22, 23, 24, the two outer plates 22 and 24 being thicker than the intermediate ones 23. The plates and the wire bundles are held under firm compression by a bolt 25 carrying a nut 26. As appears most clearly from Fig. 7 the cross-section of the rod ends formed by the plates and the wire bundles inserted between them is roughly circle-segmentary the curved surfaces having threads 8 and 9. The latter serve for mounting the rod in the same manner as the loop 5 and its support parts 6 and 7 are mounted in the embodiments according to Figs. 1–4.

In an insulator comprising a rod-shaped bias member according to Figs. 5–7 it may occur that a component force from the threads 8 and 9, respectively, is superimposed on the clamping force with which the bolt 25 and its nut 26 hold the rod wire bundles in compression between the plates 22–24. If that component force has such a direction that it opposes the force exerted by the bolt and nut the net clamping force will obviously be reduced to a value corresponding to the difference between the last-mentioned force and the component which in unfavourable cases may result in unsatisfactory clamping of the wire bundles with obvious risks of disintegration of the insulator so that the suspended line falls down. Those risks are entirely eliminated at the insulator construction illustrated in Figs. 8–10 showing the upper end of a rod 5 the threads 8 of which are entirely located above the bolt 25. In this way, any superimposition of forces as described above is effectively prevented.

A further difference between the embodiments according to Figs. 5–7 and 8–10, respectively, resides therein that in the latter case the bolt 25 is provided with spring washers 27 and 28. Moreover, annular rubber packings 29 and 30 are disposed between each of the outer plates 22 and 24 and the unit formed by the inner plates 23 and the wire bundles inserted between them. Reference numerals 31 and 32 designate sealing rings having the same function as rings 13, 14 and 16, 17 in Fig. 1. Due to the presence of the means 27–32 the compression force exerted by the bolt is kept essentially constant and independent of temperature variations.

It should be understood that the embodiments of the invention hereinabove described are but illustrative and that various modifications can be made within the frame of the appended claims. By way of example, the bolt 25 shown in Figs. 5–10 may be replaced by two or more bolts or by some similar means. Experiments have shown that it is often preferable to fill the space around the bias member 5 with a gas or a liquid of good dielectric properties. The gas which, thanks to the perfect sealing attained according to the invention preferably may have a certain pressure above atmospheric, can be e.g. nitrogen or sulphur hexafluoride. It could also be appropriate to introduce a hygroscopic substance in said space. In case it does, instead, contain a liquid, transformer oil is preferred.

I claim:

1. A suspension insulator comprising, a tubular vitreous body, metallic fixtures located at the opposite ends of the body, a rod-shaped insulating member composed of a number of vitreous wires the ends of which are held together by a binding agent, parallel plates between which the ends of the insulating member are clamped, the ends of the insulating member being substantially of circle-segmentary cross-section, with said ends having external threads, the metallic fixtures including parts having internal threads for engagement with the threads on said insulating member.

2. A suspension insulating member comprising the structure defined by claim 1 and wherein the parallel clamping plates are located inwardly of the threaded ends of the wires so that said threaded ends are spaced from the points at which the clamping force is imposed on them by said plates.

3. A suspension insulator as provided for in claim 1, wherein bolts extend through the clamping plates for maintaining said plates in clamping relationship, and resilient means are disposed at the bolts for keeping the clamping force imposed by the plates substantially constant in spite of temperature variations.

4. A suspension insulator as described in claim 3, wherein said resilient means consists of spring washers mounted on the bolts and elastic pads also mounted on the bolts, said pads being positioned between the outermost of the plates and those plates which are situated between said outermost plates.

5. A suspension insulator comprising, a tubular vitreous body, metallic fixtures at the opposite ends thereof, each of the fixtures including an internally-threaded part, an insulating member extending between the fixtures, said member consisting of a number of vitreous wires, clamping means adjacent to but spaced from the ends of the wires for holding the wires together, said insulating member having end portions projecting beyond the clamping means and provided with threads for engagement with the internal threads on the fixture parts, the clamping means comprising a plurality of plates between which the wires are clamped, bolts for urging the plates into clamping relation, and resilient means interposed between the ends of the bolts and the plates.

References Cited in the file of this patent

UNITED STATES PATENTS

| | | |
|---|---|---|
| 942,335 | Mershon | Dec. 7, 1909 |
| 1,497,319 | Austin | June 10, 1924 |
| 2,175,336 | Austin | Oct. 10, 1939 |

FOREIGN PATENTS

| | | |
|---|---|---|
| 756,866 | Great Britain | Sept. 12, 1956 |
| 532,309 | France | Nov. 11, 1921 |